United States Patent
Wellman et al.

(10) Patent No.: US 6,561,229 B2
(45) Date of Patent: May 13, 2003

(54) ELECTROSTATIC CHARGE NEUTRALIZING FUME DUCT WITH CONTINUOUS CARBON FIBER

(76) Inventors: Raymond L. Wellman, 6527 Morris Ave., El Cerito, CA (US) 95430; Michael S. Cork, 2552 Honeysuckle Dr., Richardson, TX (US) 75082

( * ) Notice: Subject to any disclaimer, the term of this patent is extended or adjusted under 35 U.S.C. 154(b) by 94 days.

(21) Appl. No.: 09/882,683

(22) Filed: Jun. 18, 2001

(65) Prior Publication Data

US 2002/0017333 A1 Feb. 14, 2002

Related U.S. Application Data

(63) Continuation-in-part of application No. 09/603,468, filed on Jun. 26, 2000.

(51) Int. Cl.$^7$ .................................................. F16L 9/14
(52) U.S. Cl. ...................... 138/146; 138/132; 138/153; 138/DIG. 7; 138/174; 428/36.4
(58) Field of Search ................................. 138/146, 153, 138/129, 140, 141, DIG. 2, DIG. 7, 137, 174, 149, 154; 428/36.4, 34.5, 34.6, 377

(56) References Cited

U.S. PATENT DOCUMENTS

| | | | | |
|---|---|---|---|---|
| 4,013,102 A | * | 3/1977 | DeLorean et al. | 138/144 |
| 4,157,101 A | * | 6/1979 | Ross | 138/130 |
| 5,244,016 A | * | 9/1993 | Kuroda et al. | 138/103 |
| 5,261,462 A | * | 11/1993 | Wolfe et al. | 138/130 |
| 5,298,299 A | | 3/1994 | Shea | 428/34.5 |
| 5,383,994 A | | 1/1995 | Shea | 156/175 |
| 5,549,949 A | | 8/1996 | Williams et al. | 428/36.9 |

* cited by examiner

Primary Examiner—Patrick Brinson
(74) Attorney, Agent, or Firm—Donald Diamond

(57) ABSTRACT

A self-grounding laminated dual wall fume duct for transporting corrosive vapors and gases, and a process for fabricating the inner and outer walls. The innermost layer of the inner wall is made of a cured epoxy vinyl ester resin incorporating continuous carbon fibers forming a continuous surface integrated with the inner surface of the innermost layer. The electrically conductive fibers act to dissipate and neutralize electrostatic charges generated by triboelectric processes.

13 Claims, 5 Drawing Sheets

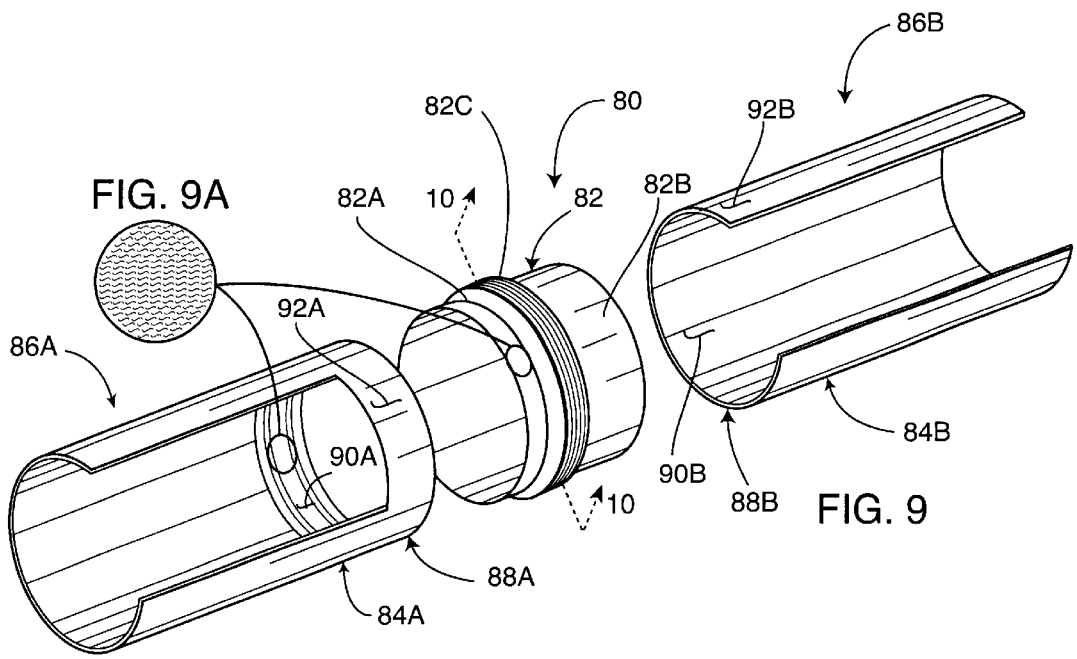
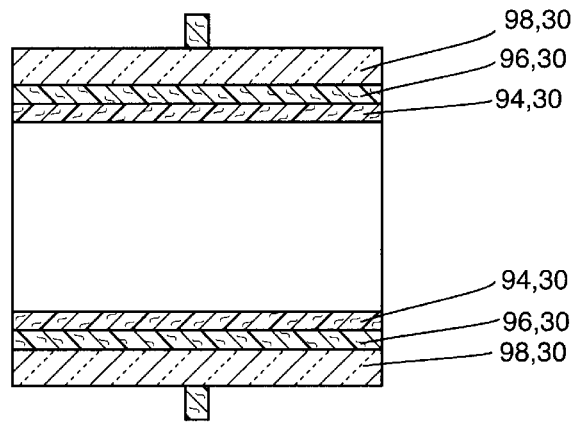

ELECTROSTATIC CHARGE NEUTRALIZING FUME DUCT WITH CONTINUOUS CARBON FIBER

CROSS-REFERENCE TO RELATED APPLICATION

This application is a continuation-in-part of application Ser. No. 09/603,468 filed Jun. 26, 2000, entitled "Electrostatic Charge Neutralizing Fume Duct," now pending.

BACKGROUND OF THE INVENTION

1. Field of the Invention

The present invention relates to fume exhaust ducts and more particularly to a dual wall duct having a laminated inner wall whose innermost layer incorporates continuous, helically-wound carbon fibers which dissipate and neutralize built-up electrostatic charges resulting from vapors or gases flowing within the duct.

2. Description of the Related Art

Ductwork for corrosive or otherwise dangerous vapor and gas exhaust systems is used extensively in many diverse industries which utilize hazardous chemicals to process raw materials or perform manufacturing procedures, such as the semiconductor industry, the plating industry, and the pharmaceutical industry. Such ductwork also is required in the many research and development laboratories which use highly reactive, toxic or otherwise hazardous chemicals in conducting experiments. Consequently, vapors from such chemicals must be exhausted through leak-proof air ducts to safely remove them from work areas. Installations can be very large, consisting of many thousands of feet of ductwork which may be manifolded and connected to multiple exhaust fans. Because of the wide diversity of chemicals used in industrial and research applications, it is extremely difficult to provide a single material for fabricating ductwork which can withstand all the chemicals to which duct interiors may be exposed. Materials which have been used heretofore to fabricate fume exhaust ductwork include black steel, galvanized steel and stainless steel, as well as plastic materials such as polyvinylchloride, polypropylene, coated materials, and fiberglass reinforced plastics (FRP's). Over the past forty years the trend in materials has been away from metals and coated metals and toward the use of plastics, particularly FRP's.

Various types of resins have been used in manufacturing FRP's. Some are resistant to certain families of chemicals, but no single resin can resist all the vapors used in industries such as semiconductor manufacturing and electroplating. Another problem is providing adequate resistance to fire. Unlike metallic ducts, plastic ducts exhausting chemicals which can react exothermically with themselves or with duct surfaces are at risk to combustion. Plastics typically burn rapidly and generate much smoke, creating hazards of their own. A third problem in using plastic is the possibility of static electrical charge building up on a duct's interior surface. Electrostatic charge is usually generated by frictional processes during contact and separation of materials. So-called "triboelectric charging" can occur even when dry media such as air or air laden with dust particles flow through ungrounded plastic pipes. Because plastic is an insulator, a considerable amount of charge can be generated on a duct's inner surface. An insulative material does not readily allow the flow of electrons, so both positive and negative charges can reside on the surface at the same time, although at different sites. If the voltage at a site builds up sufficiently, an electrostatic discharge will occur creating an arc which, depending on the characteristics of the ambient vapor, can trigger an explosion or fire. Perhaps the worst cases when exhausting hazardous vapors are those containing halogens such as fluorine or chlorine and those containing metallic vapors such as cesium or potassium. Such vapors are easily ionized as well as highly corrosive and/or toxic.

U.S. Pat. Nos. 5,298,299 ("'299") and 5,383,994 ("'994") to L. E. Shea, which are incorporated in their entirety herein by reference, are directed to, respectively, a composite fume exhaust duct having both good chemical resistance and good fire resistance properties, and a method for making the dual-laminate duct. Ducts made in accordance with the invention described in these patents are generally tubular with a diametral size in the range of 2 inches to 84 inches, and have an inner laminate portion of chemically resistant material covered by and integral with an outer laminate portion of fire retardant material. The inner laminate is comprised of material such as fiberglass which is saturated with a chemically resistant resin such as a halogenated vinyl ester. The outer laminate which covers the inner laminate is similarly comprised of fabric or fiberglass material which is combined with a resorcinol or phenol/resorcinol type fire-retardant resin. The duct is formed by first coating a Mylar wrapped mandrel with the chemically resistant resin and then wrapping the mandrel with successive layers of fabric material saturated with the resin. The outer fire-retardant laminate is then formed directly over the inner laminate by applying successive layers of a suitable fabric material saturated with the fire-retardant resin. The composite structure is then allowed to cure and harden before being removed from the mandrel. U.S. Pat. No. 5,549,949 ("'949") to D. Williams et al., which is incorporated in its entirety herein by reference, is directed to sealant compositions for sealing the circumferential joint between pairs of dual-laminate fume duct sections, and a joint sealing method enabling strong bonding between the sealant and phenolic/glass and vinyl ester surfaces without sanding mating surfaces. Such duct sections and connecting joints do not, however, eliminate or even mitigate the hazard of static charge build-up on the innermost surface of the inner laminate, which typically has a resistivity of the order of $10^{14}$–$10^{15}$ ohms-cm.

Application Ser. No. 09/603,468 ("'468") is directed to a dual wall fume duct wherein the innermost layer of the laminated inner wall is made of a cured epoxy vinyl ester resin impregnated with chopped carbonized carbon fibers. The inner surface of the duct described therein can withstand degradation from corrosive fumes while also neutralizing triboelectric charges. However, the fabrication method needs to be improved to achieve higher production rate and better quality control of the end product. Applying the carbon fibers to a rotating mandrel coated with liquid resin is a time-consuming manual procedure not amenable to standardization and quality control. Moreover, the '468 application is not directed to providing high electrical conductivity across connecting joints.

OBJECTS OF THE INVENTION

In view of the limitations of the related art, it is a primary object of the present invention to provide an improved self-grounding fume exhaust duct, having an innermost portion withstanding hazardous fumes while dissipating and neutralizing electrostatic charge build-up, fabricated using a substantially automated method.

Another object of the invention is to provide a self-grounding duct fabricated using a production method amenable to standardization and high quality control.

Yet another object of the invention is to provide a self-grounding joint for joining duct sections.

Other objects of the invention will become evident when the following description is considered with the accompanying drawing figures. In the figures and description, numerals indicate the various features of the invention, like numerals referring to like features throughout both the drawings and description.

SUMMARY OF THE INVENTION

These and other objects are achieved by the present invention which in a first aspect provides a self-grounding dual wall duct for transporting corrosive vapors and gases having a laminated inner wall including an innermost layer of cured epoxy vinyl resin in which are embedded contiguous helical segments of electrically conductive continuous ribbons forming a continuous ribbon-layer integrated with the innermost layer inner surface.

In another aspect the invention provides a process for fabricating a self-grounding dual wall laminated duct for transporting corrosive vapors and gases, which includes the steps of: forming a fluidic admixture of an epoxy vinyl ester resin and a curing agent; evenly coating a horizontal mandrel covered with a polyester sheeting with the admixture to form a thin layer; helically winding around the mandrel a band including electrically conductive, continuous ribbons, disposed edge-to-edge, each having continuous longitudinal carbon filaments impregnated with the admixture, so that contiguous helical segments form a continuous first ribbon-layer which is embedded in the admixture layer and integrated with the layer interior surface; helically winding additional band to form a thickness of ribbon-layers; evenly coating a second layer of the admixture; rolling out air trapped in the ribbon-layers; helically winding a layer of mat-type fiberglass, post-wetted with the admixture; and curing the admixture.

The process further includes: forming an admixture of a phenolic impregnating resin and a catalyst therefor; evenly coating the fiberglass outer surface with a thin layer of the admixture; helically winding a band of continuous glass filament ribbons impregnated with the admixture to form an inner glass filament layer; rolling out air trapped in the inner layer; helically winding additional band to form an outer glass layer; rolling out air trapped in the outer glass layer; helically winding a layer of glass veil, wetted out with the admixture; and curing the admixture.

A more complete understanding of the present invention and other objects, aspects and advantages thereof will be gained from a consideration of the following description of the preferred embodiment read in conjunction with the accompanying drawings provided herein.

BRIEF DESCRIPTION OF THE DRAWINGS

FIG. 9 is an exploded perspective, partial sectional view of two duct sections joined using a collar and a sealant admixture of resin, curing agent, thickener, and carbonized chopped carbon fibers.

FIG. 9A schematically depicts the circled regions "9A" in FIG. 9, showing carbon fibers distributed homogeneously in the sealant admixture.

FIG. 10 is a sectional view taken along line 10—10 of FIG. 9.

DESCRIPTION OF THE PREFERRED EMBODIMENT

I. Introduction

Figure 1:
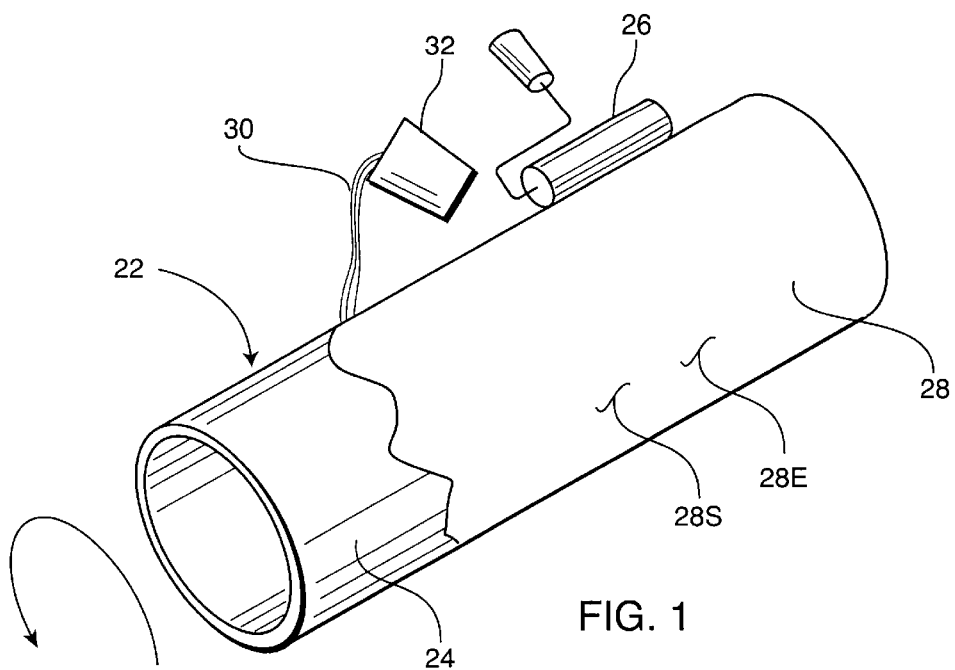
FIG. 1 schematically shows a first step in making an electrically conductive laminated inner wall of a dual-wall fume exhaust duct, wherein a thin coating of an admixture of epoxy vinyl ester resin and curing agent is rolled onto a rotating Mylar-covered mandrel.

While the present invention is open to various modifications and alternative constructions, the preferred embodiment shown in the drawings will be described herein in detail. It is to be understood, however, there is no intention to limit the invention to the particular form disclosed. On the contrary, it is intended that the invention cover all modifications, equivalences and alternative constructions falling within the spirit and scope of the invention as expressed in the appended claims.

II. Inner Wall Laminate Assembly

Figure 8:
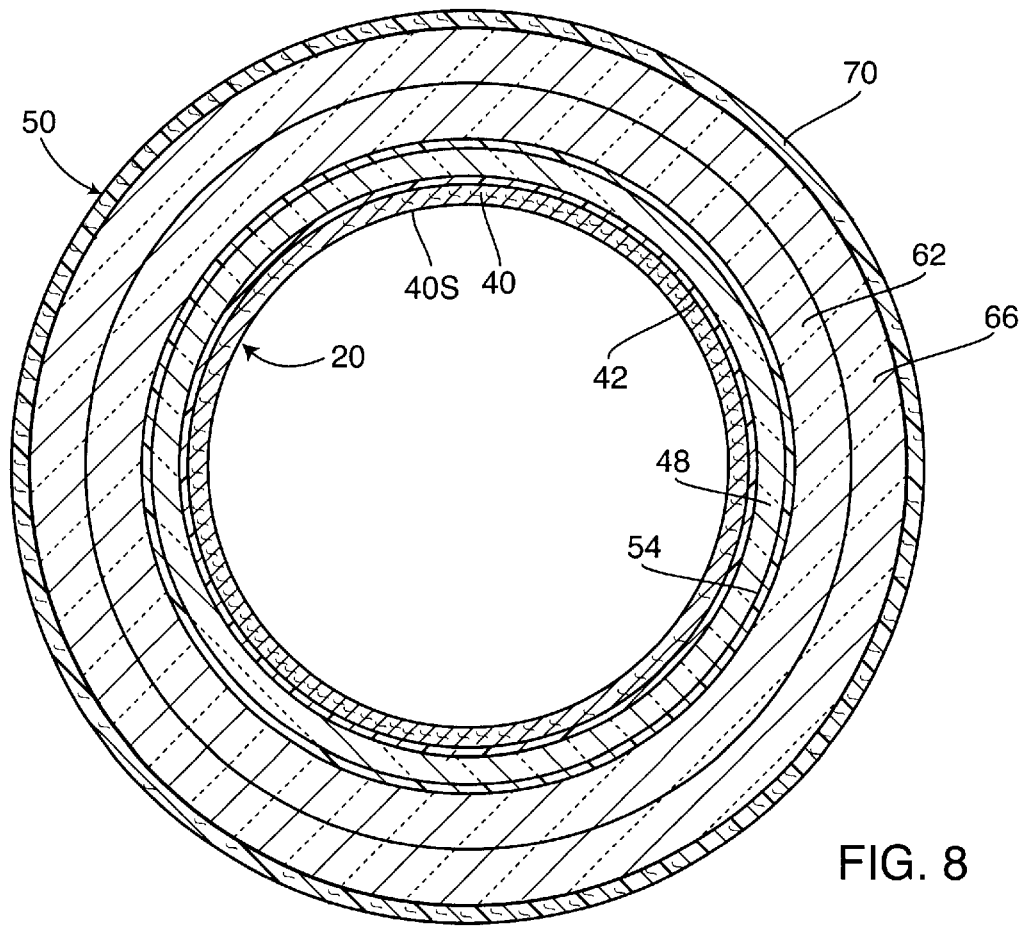
FIG. 8 is a schematic cross-sectional view of the inner and outer wall laminates.

FIGS. 1–4 show sequential steps in fabricating a fume exhaust duct laminated inner wall 20 as shown in FIG. 8. Referring to FIG. 1, in a first step a slowly rotating, generally circular mandrel 22 covered with Mylar sheeting 24 is evenly coated using a fiberglass applicator roller 26 with a thin layer 28 of a liquid admixture 30 of epoxy vinyl ester impregnating resin and a curing agent, viz., benzoyl peroxide. Alternatively, the sheeting may be another type of polyester. Layer 28 has an interior surface 28S contiguous to the sheeting 24 and an exterior surface 28E. Layer 28 is 2 to 3 mils in thickness and is dispensed from a suitable dispensing device 32. The benzoyl peroxide, which is 1 to 5 percent-by-weight relative to the weight of the resin, cures the liquid resin to a solid at ambient temperature. About 0.3 pound of resin per square foot of mandrel surface area is used. The chemically inert Mylar acts as a "bond-breaker" allowing the assembled duct to be easily removed from the mandrel. Preferably, the resin is type 510A-40 DERAKANE™ manufactured by the Dow Chemical Company of Channahon, Ill.

Mandrel 22 is clamped generally horizontally between a rotating chuck and a tailstock spindle of a filament winding machine, and rotates at a selectable constant rate. A two-axis machine, specifically "Basic Production Series Model WBP" manufactured by McClean Anderson Corp. of Schofield, Wis. is used to apply a matrix of fibers and resin under controlled tension to the mandrel in a predetermined geometrical pattern. Continuous strands of fiber filament ribbon, unwound from a plurality of contiguous spools and paid out from a pivotable payout eye mounted on a base that rides on a carriage, are passed through an impregnating resin bath before being wound onto the mandrel. The base moves along a crossfeed axis in reciprocal directions perpendicular to the axis of mandrel rotation. Similarly, the carriage moves in reciprocal directions along a translational axis that is parallel to the axis of mandrel rotation. In order to properly wind the filaments in a pattern that precisely covers the mandrel, movements along the translational and crossfeed axes as well as pivoting of the payout eye must all be coordinated with respect to one another and with the mandrel rotation. The machine can be programmed to do either circumferential or helical winding. Helical winding is always used in duct fabrication because it provides rigidity and structural strength. Winding parameters for a helical pattern are input to a software package ("PATTERNMASTER II"™) which outputs a list of feasible patterns. A desired pattern is then specified by manually inputting the corresponding machine parameters into a control console keyboard.

Figure 2:
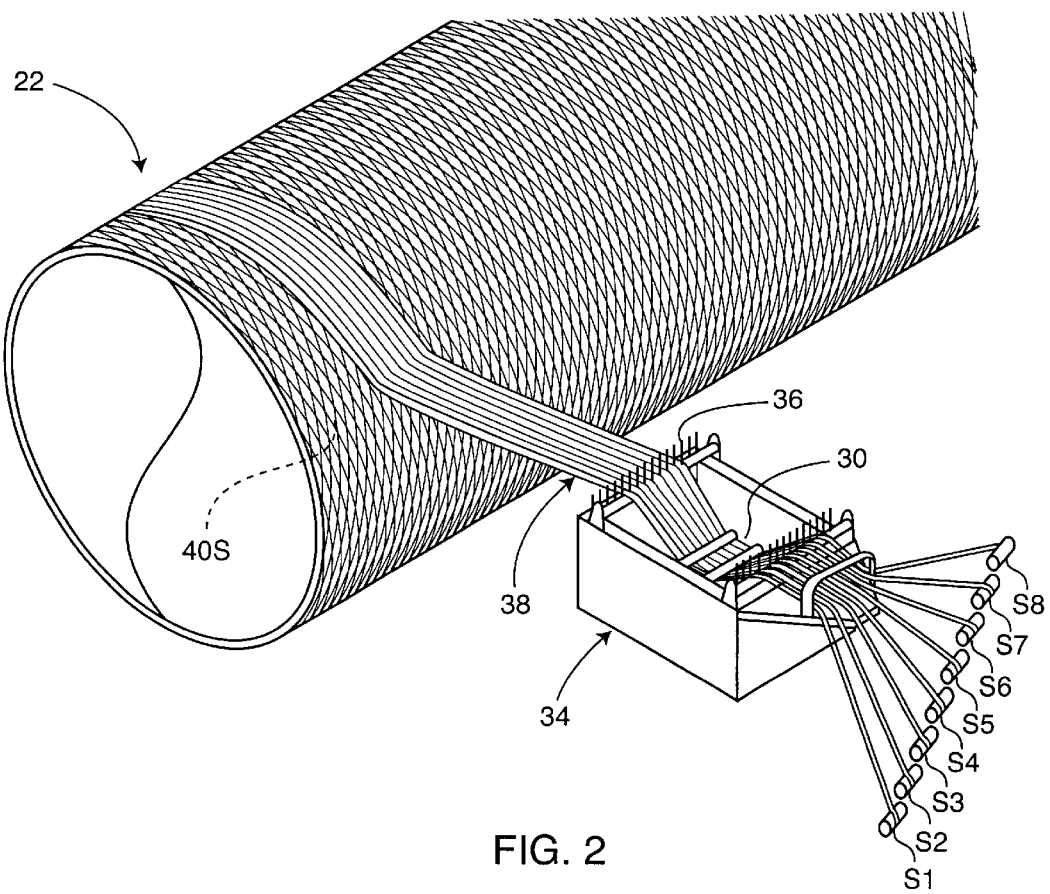
FIG. 2 schematically shows a second step in making the inner wall wherein continuous, contiguous carbon fiber filament ribbons, after transiting a bath containing the FIG. 1 admixture, are helically wound around the mandrel until its surface is totally covered with a predetermined thickness of ribbon-layers.

Referring to FIG. 2, in a second step a plurality of continuous carbon fiber filament ribbons is helically wound onto mandrel 22 after passage through a bath 34 containing impregnating resin-and-curing agent admixture 30. In a preferred embodiment eight ribbons, each about 0.250-inch in width and about 0.010-inch in thickness, after unwinding from contiguous spools S1, S2, S3, S4, S5, S6, S7, S8, are aligned edge-to-edge by a payout eye 36 to form a two-inch wide band 38 after exiting the bath 34. The band is wound helically at an angle of about 72° with respect to the longitudinal axis of the mandrel. To keep the angle constant, the WBP machine compensates for the change in winding diameter occurring as ribbon-layers build up on the mandrel surface. An initial helix is wound so that successive band segments are aligned edge-to-edge to form a continuous ribbon-layer. This ribbon-layer is embedded in liquid layer 28 so that interior surface 28S is integrated with a smooth continuous surface 40S (see FIG. 8) of resin-impregnated carbon which preferably is about 63 percent carbon and 37 percent admixture, by weight, within a feasible range of about 50 to 70 carbon and about 30 to 50 percent admixture. Thereafter, the (N+1)st helix either leads the Nth helix (i.e., the (N+1)st helix is placed on a path that comes into view, as the mandrel rotates, before the path on which the Nth helix was placed) or lags the Nth helix (i.e., the (N+1)st helix comes into view after the Nth helix), so that gaps between adjacent band segments are created, thus forming an interwoven pattern whose gaps are filled in as the payout eye 36 moves back and forth between the mandrel ends. The criterion for how many carriage circuits (i.e., end-to-end round-trips) are required to form a carbon layer 40 (see FIG. 8) is not total coverage with a minimum number of ribbon-layers, but rather laying down a thickness providing sufficient structural strength. The strength required is determined mainly by duct diameter. Typically, the thickness is 50 or 60 mils (i.e., five or six layers). Alternatively, a lesser or greater number of filament ribbons may be used to provide a narrower or wider bandwidth. The filament ribbon used is PANEX®33–48K continuous carbon fiber which has a filament count of 45,700 and a yield of 450 ft/lb, manufactured from polyacrylonitrile (PAN) precursor by Zoltek Corporation of St. Louis, Mo.

Figure 3:
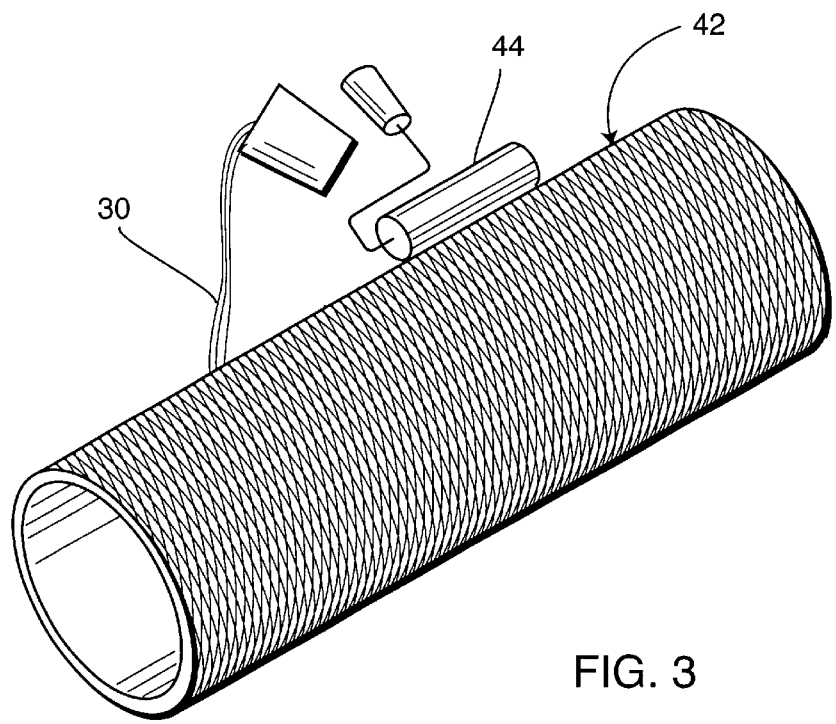
FIG. 3 schematically shows a third step in making the inner wall wherein a thin coating of the FIG. 1 admixture is applied to the FIG. 2 mandrel and trapped air is rolled out with a roller.

Referring to FIG. 3, in a third step the outermost carbon fiber ribbon-layer is evenly coated with a thin layer 42 (see FIG. 8) of admixture 30, and a fiberglass "deairing" roller 44 is used to roll out air trapped in the carbon fiber ribbon-layers. Layer 42 typically is 2–3 mils in thickness.

Figure 4:
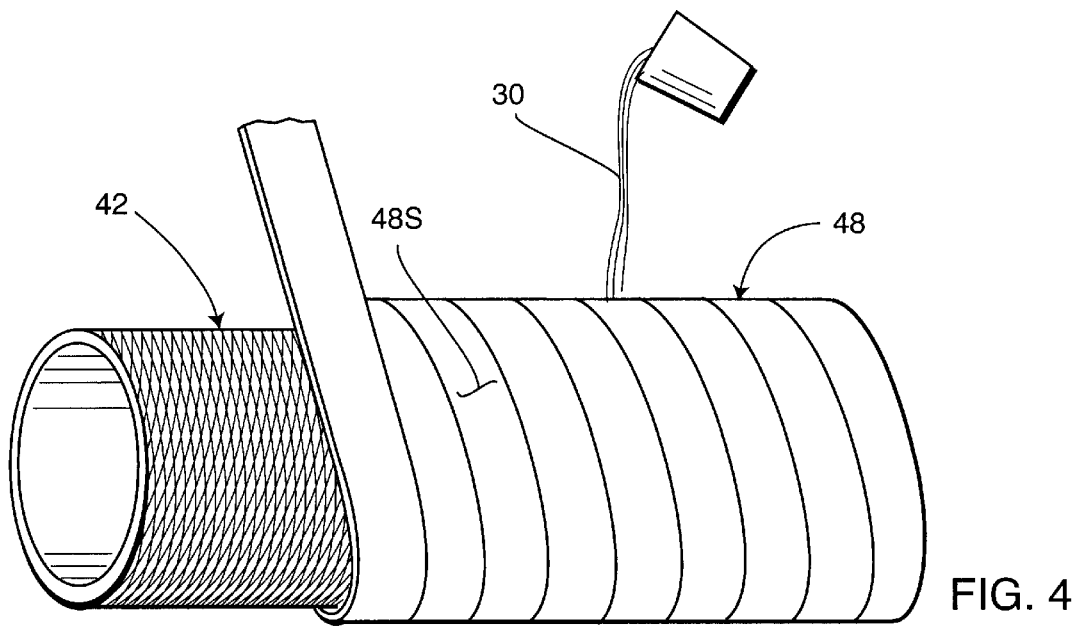
FIG. 4 schematically shows a fourth step in making the inner wall wherein a layer of glass mat wetted out with the FIG. 1 admixture is wound around the FIG. 3 mandrel.

Referring to FIG. 4, in a fourth step a layer 48 (see FIG. 8), with an outer surface 48S, of 0.75 ounce per square yard ($oz/yd^2$) mat-type fiberglass, 25 to 32 mils in thickness and post-wetted with admixture 30, is helically wound over liquid layer 42. Typically, the fiberglass matting is about 4 inches in width. This completes assembly of the duct inner wall 20 (see FIG. 8) which preferably has a total thickness of about 80 mils within a range of 50 to 100 mils, and a composition which preferably is about 45 percent admixture, about 36 percent carbon and about 19 percent fiberglass mat within a feasible range of about 40 to 60 percent admixture, about 27 to 40 percent carbon, and about 13 to 20 percent fiberglass. The inner wall laminate is allowed to cure at room temperature for about 20 to 30 minutes before beginning fabrication of the outer wall.

III. Outer Wall Laminate Assembly

Figure 5:
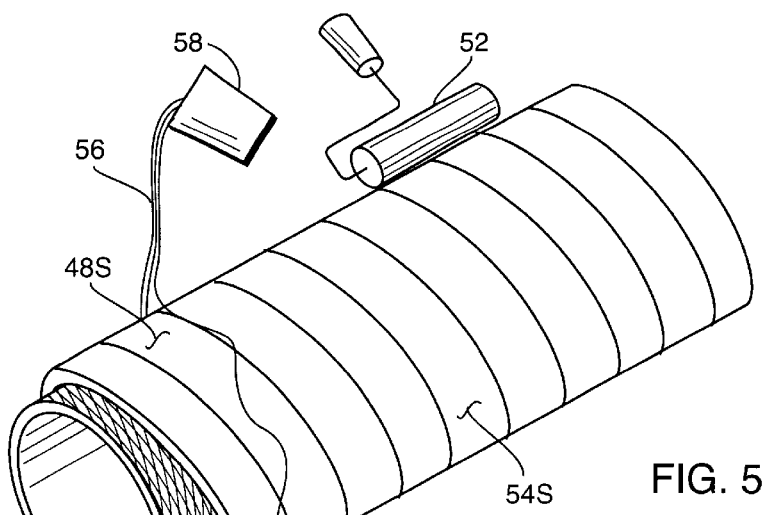
FIG. 5 schematically shows a first step in making a laminated outer wall of the FIG. 1 duct, wherein a thin coating of an admixture of phenolic resin and curing agent is rolled onto the FIG. 4 mandrel.
Figure 6:
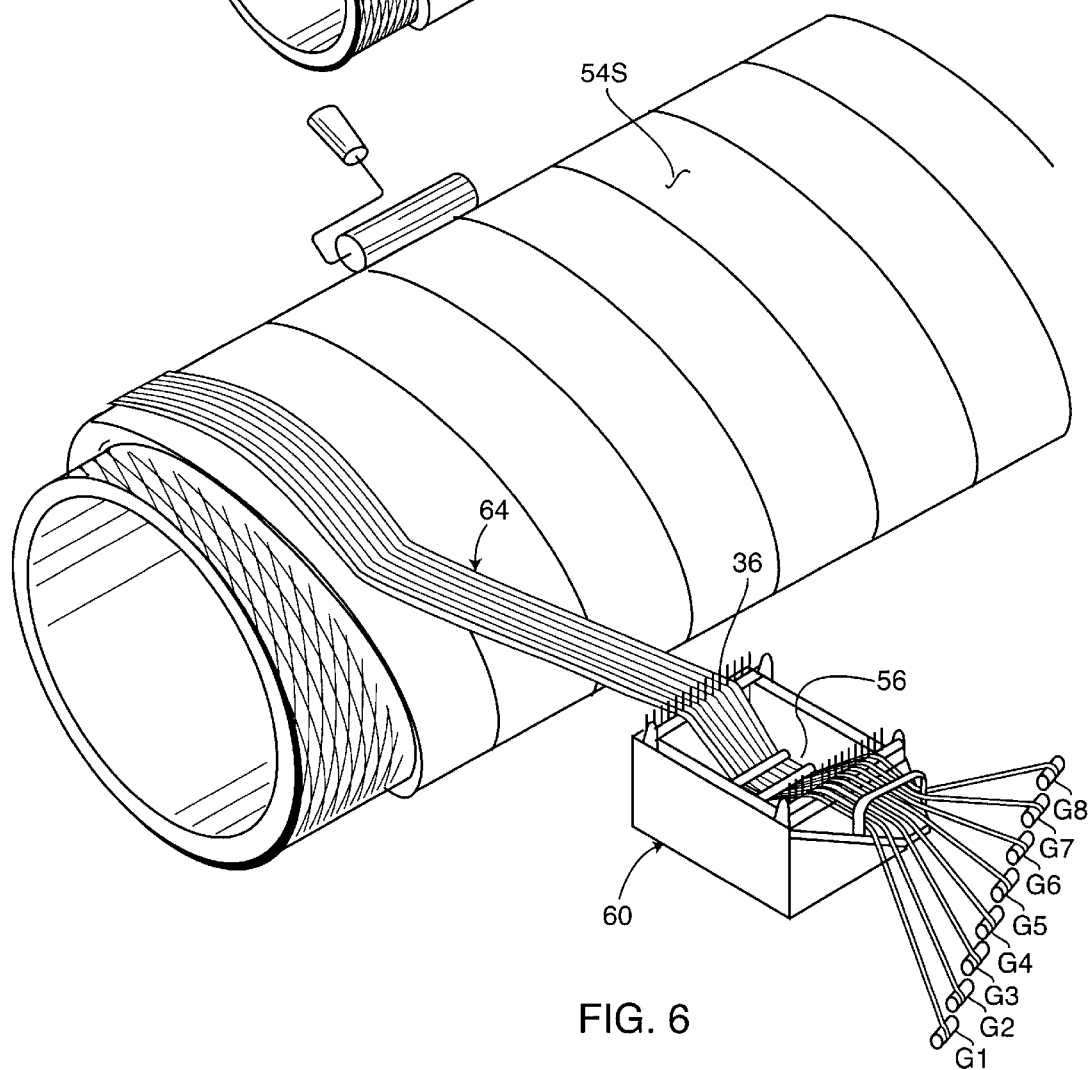
FIG. 6 schematically shows second and third steps in making the outer wall wherein first and second layers, respectively, of continuous, contiguous glass fiber filament ribbons, after transiting a bath containing the FIG. 5 admixture, are helically wound around the FIG. 5 mandrel until its surface is totally covered with a predetermined thickness of filamemt-layers. Trapped air is rolled out after each layer is completed.
Figure 7:
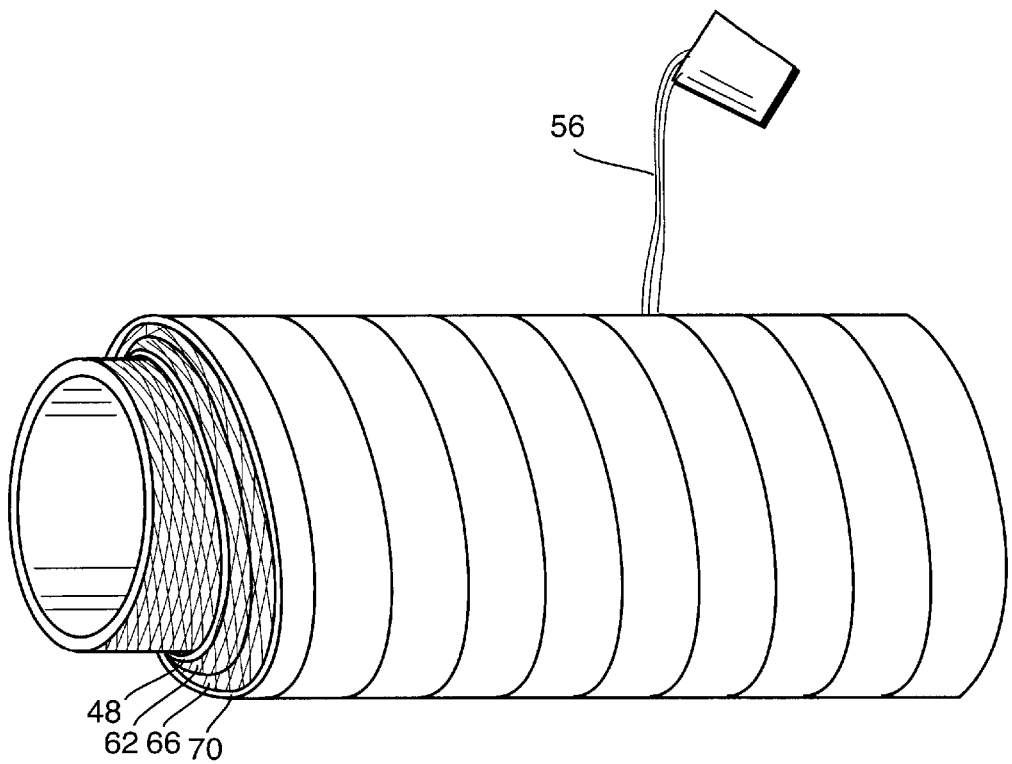
FIG. 7 schematically shows a fourth step in making the outer wall wherein a layer of glass "C" veil, wetted out with the FIG. 5 admixture, is wound around the FIG. 6 mandrel.

FIGS. 5–7 show sequential steps in fabricating an outer wall 50 as shown in FIG. 8. Referring to FIG. 5, in a first step surface 48S is evenly coated using a fiberglass applicator roller 52 with a thin layer 54 (see FIG. 8) of a liquid admixture 56 of a phenolic impregnating resin and a catalyst therefor as, for example, a phenolic resin and catalyst as described in the '299 and '994 patents, dispensed from a dispensing device 58. Layer 54 has an outer surface 54S and is 2 to 3 mils in thickness. Phenolic resins for use in the preparation of filament wound products are available from Georgia-resins, Inc. of Decatur, Ga.

Referring to FIG. 6, in a second step a plurality of continuous glass filament ribbons is helically wound over surface 54S, after passage through a bath 60 containing phenolic impregnating resin-and-catalyst admixture 56, to form a first glass layer 62 (see FIGS. 7, 8). In FIG. 6, formation of the layer 62 is just beginning. In the preferred embodiment eight ribbons, each about 0.250-inch in width and about 0.040-inch in thickness, after unwinding from contiguous spools G1, G2, G3, G4, G5, G6, G7, G8, are aligned edge-to-edge by the payout eye 36 to form a two-inch wide band 64 after exiting bath 60. The band is wound helically at an angle of about 72°. with a feasible angle being from about 55° to about 72°. As is the case for the deposition of the carbon filament, the criterion for how thick layer 62 needs to be depends on the structural strength required for particular ductwork applications. Depending on duct diameter, the thickness range is about $\frac{1}{32}$-inch to about $\frac{5}{16}$-inch, with $\frac{5}{16}$-inch preferred for larger diameter ducts. After the desired thickness is reached, roller 44 is used to roll out air trapped in the glass ribbon-layers. An outer glass layer 66 (see FIGS. 7, 8) is then formed in a third step that repeats the second step, so that the combined thickness of glass is about 0.062- to about 0.625-inch. Alternatively, a lesser or greater number of ribbons may be used to provide a narrower or wider bandwidth. The weight of the glass filament used is 250 ft/lb; such filament is widely available from glass distributors.

Referring to FIG. 7, in a fourth step a layer 70 of glass "C" veil, 10 mils in thickness and post-wetted with phenolic admixture 56 is helically wound around the glass layer 66. Typically, the "C" veil width is about 4 inches. "C" veil is glass fiber tissue of randomly dispersed glass fibers bonded into a sheet by a polyester resin. The fibers are produced from "C" glass, a chemically resistant glass which is highly resistant to attack by both acid and alklaline environments.

"C" veil is available from Owens Corning Corp. This completes assembly of the duct outer wall 50 (see FIG. 8) which has a total thickness within a range of about 0.074- to about 0.638-inch, and a composition which preferably is in a range of about 35 to 40 percent phenolic admixture and about 60 to 65 percent glass filament within a feasible range of 25 to 50 percent admixture and 50 to 75 percent glass. The outer wall laminate cures at ambient temperature when a formaldehyde composition is used as the catalyst.

IV. Collar and Sealant Joining Two Duct Sections

The '949 patent describes a fume duct construction joint including a collar disposed between opposed dual-laminate duct section ends, and a circumferential joint bond for sealingly circumscribing the joint. FIGS. 9, 9A and 10 show a joint and sealant adapted to provide high electrical conductivity, and thereby self-grounding, across the joint. Referring to FIG. 9, a joint assembly 80 includes a collar 82 having opposed first and second portions 82A, 82B symmetric with respect to a circumferential rib 82C. Collar 82 is disposed between end portions 84A, 84B, respectively, of first and second dual-laminate duct sections 86A, 86B having edge portions 88A, 88B with, respectively, circumferential inner surfaces 90A, 90B and circumferential outer surfaces 92A, 92B. Collar portions 82A, 82B are closely received, respectively, within edge portions 88A, 88B. As shown in FIG. 10, the collar 82 has a laminate construction, two inner layers 94, 96 of carbon ribbon-layers and resin admixture 30, and an outer layer 98 of glass ribbon-layers and resin admixture 30 of sufficient thickness to build the total wall thickness to a preselected dimension. Preferably, the combined thickness of carbon layers 94, 96 is about 0.126- to 0.187-inch.

The '949 patent further describes sealant compositions which provide strong bonding to phenolic/glass and vinyl ester surfaces without sanding mating surfaces. As shown schematically in FIG. 9A, in the present invention the sealant is modified to include the quarter-inch chopped carbonized carbon fibers disclosed in the '468 application. The PANEX™ 33-CF fibers, manufactured by Zoltek Corporation, have a diameter of 0.283 mil, a density of 0.065 lb/in$^3$, and an electrical resistivity of 0.00068 ohm-in. A sealant composition so modified includes per 100 parts-by-weight, about 10 to 30 parts-by-weight of hardener, and about 10 to 60 parts-by-weight of carbon fibers. A preferred sealant composition includes per 100 parts-by-weight, about 14.5 parts-by-weight of hardener, and about 25 parts-by-weight of carbon fibers. A thickener can be added to the sealant composition where a higher viscosity is desired.

Thus, all portions of joint assembly 80, viz., duct sections 86A, 86B and collar 82, are self-grounding. It should be noted that the method described herein also is applicable to fabrication of storage and vehicular fuel tanks where self-grounding is essential to prevent explosions.

V. Resistivity Test Results

A. Test Method

Volume resistivity tests according to ASTM D 4496-87 were performed on specimens cut from a duct assembly having two dual-wall sections fabricated according to the present invention, joined by a collar and sealant according to the invention. The tests were performed by Delsen Testing Laboratories, Inc. of Glendale, Calif. Specifically, the assembly consisted of two 6-inch (inner diameter) duct sections 15.7 inches and 14.7 long, joined by a collar 5.0-inches long. First, the assembly was cut lengthwise (axially) end-to-end into two portions, arbitrarily identified herein as Tube 1 and Tube 2. A four-point measurement technique was used to determine the resistance of these "Tube" specimens. Two conductive silver paint lines were applied on the inner surface of each specimen, one line proximate to each end, to serve as current electrodes. Four pairs of opposed conductive silver paint lines, D1—D1, D2—D2, D3—D3, D4—D4, were applied on the inner surface of each specimen across the width, symmetric with respect to the collar median, to serve as potential electrodes. On Tube 1, the line-pair separations were: D1—D1, 24.0 inches; D2—D2, 17.2 inches; D3—D3, 5.9 inches; D4—D4, 2.2 inches. (Thus, the D4—D4 lines were on the collar.) On Tube 2, the separations were as follows: D1—D1, 24.1 inches; D2—D2, 17.3 inches; D3—D3, 5.7 inches; D4—D4, 2.0 iuches. While DC current was applied to a Tube specimen through the two outer electrodes, the potential drop between each pair of potential electrodes was measured.

Next, ten specimens, each 7-inches by 0.5-inch, were cut lengthwise (axially) from Tube 1. Five of these, C1, C2, C3, C4, C5, were cut to include all of the collar plus two opposed short duct stubs adhered to the collar with sealant. Thus, each specimen included a segment of the juncture between each duct section end and the collar. The other five, E1, E2, E3, E4, E5, were cut entirely from a duct section. Since the specimens were machined wet, they were first blow-dried with filtered compressed air before being dried at room ambient conditions for a minimum of 16 hours. For the C1, C2, C3, C4, C5 specimens, opposed ends of the inner surface of each were painted with conductive silver paint to serve as current electrodes. One set of two conductive silver paint lines, identified as "-E" in the following tables, was applied across the width of the duct section inner surface to serve as potential electrodes. Four conductive silver paint lines were applied on the collar inner surface. While a DC current was applied to a specimen through the two current electrodes, the potential drop between the several pairs of collar electrodes was measured. These measurements are identified as "-C" in the tables. For the E1, E2, E3, E4, E5 specimens, opposed ends of the inside surface of each were painted with silver conductive paint to serve as current electrodes. Two sets of two conductive silver paint lines were applied across the width of the inner surface of each specimen to serve as potential electrodes. Two sets of measurements were made on each specimen. In the following tables the measurements made between the lines proximate to the opposed ends are identified as "-E" ; the measurements made between the lines close to the center of the specimen are identified as "-C."

Resistance was calculated as follows:

$$R=V/I$$

where R=resistance (ohms); V=potential drop (volts); I=applied currrent (amperes).

For a resistance measurement to be valid, the sample must be isotropic so that the current is uniformly distributed during testing. In view of the fabrication process described herein, this likely was the case. Because the outer wall of the test samples was non-conductive, it was assumed that current flowed only through the inner wall.

B. Test Results

All tests were performed at 73° F temperature and 47% relative humidity. Tables 1 and 2 show the resistances measured on Tube 1 and Tube 2, respectively. In all cases the measured resistance is extremely low. Since having even one highly conducting path among the multiplicity of paths connecting the two potential electrodes would dominate a measurement, the near-zero values are not surprising. Tables 3 and 4 show the resistances measured on the C1, C2, C3, C4, C5 specimens. The Table 4 measurements are significantly lower than those in Table 3 because the potential drop is between points internal to the collar rather than across the duct end-collar junctures. In both cases the current flows across the two junctures. Tables 5 and 6 show the resistances measured on the E1, E2, E3, E4, E5, E6 specimens. As expected, the measured values decrease with decreasing separation between the potential electrodes. That these values are higher than those in Table 3, where the potential drop was measured across both junctures, suggests that there are axial anisotropies in the duct section inner wall whose resistance is higher than the least resistance when more electrode-to-electrode paths are available.

TABLE 1

Tube 1

| Current Direction | Specimen Width (inches) | Potential Electrode Separation (inches) | Resistance (ohms) |
|---|---|---|---|
| D1—D1 | | | |
| Forward | 9.7 | 24.0 | 1.94 |
| Reverse | 9.7 | 24.0 | 1.94 |
| D2—D2 | | | |
| Forward | 9.7 | 17.2 | 1.60 |
| Reverse | 9.7 | 17.2 | 1.61 |
| D3—D3 | | | |
| Forward | 9.7 | 5.9 | 1.03 |
| Reverse | 9.7 | 5.9 | 1.03 |
| D4—D4 | | | |
| Forward | 9.7 | 2.2 | 0.0050 |
| Reverse | 9.7 | 2.2 | 0.0051 |

TABLE 2

Tube 2

| Current Direction | Specimen Width (inches) | Potential Electrode Separation (inches) | Resistance (ohms) |
|---|---|---|---|
| D1—D1 | | | |
| Forward | 9.5 | 24.1 | 2.45 |
| Reverse | 9.5 | 24.1 | 2.45 |
| D2—D2 | | | |
| Forward | 9.5 | 17.3 | 2.08 |
| Reverse | 9.5 | 17.3 | 2.08 |
| D3—D3 | | | |
| Forward | 9.5 | 5.7 | 1.43 |
| Reverse | 9.5 | 5.7 | 1.42 |
| D4—D4 | | | |
| Forward | 9.5 | 2.0 | 0.0087 |
| Reverse | 9.5 | 2.0 | 0.0087 |

TABLE 3

"C" Specimens - Trans-Junctures

| Current Direction | Specimen Width (inches) | Potential Electrode Separation (inches) | Resistance (ohms) |
|---|---|---|---|
| C1-E | | | |
| Forward | 0.50 | 5.89 | 518 |
| Reverse | 0.50 | 5.89 | 518 |
| C2-E | | | |
| Forward | 0.50 | 5.89 | 265 |
| Reverse | 0.50 | 5.89 | 265 |
| C3-E | | | |
| Forward | 0.50 | 5.87 | 165 |
| Reverse | 0.50 | 5.87 | 165 |
| C4-E | | | |
| Forward | 0.50 | 5.89 | 408 |
| Reverse | 0.50 | 5.89 | 408 |
| C5-E | | | |
| Forward | 0.50 | 5.89 | 310 |
| Reverse | 0.50 | 5.89 | 310 |

TABLE 4

"C" Specimens - Intra-Collar

| Current Direction | Specimen Width (inches) | Potential Electrode Separation (inches) | Resistance (ohms) |
|---|---|---|---|
| C1-C | | | |
| Forward | 0.50 | 2.22 | 12.4 |
| Reverse | 0.50 | 2.22 | 12.4 |
| C2-C | | | |
| Forward | 0.50 | 2.23 | 15.8 |
| Reverse | 0.50 | 2.23 | 15.8 |
| C3-C | | | |
| Forward | 0.50 | 2.23 | 14.3 |
| Reverse | 0.50 | 2.23 | 14.3 |
| C4-C | | | |
| Forward | 0.50 | 2.24 | 12.8 |
| Reverse | 0.50 | 2.24 | 12.8 |
| C5-C | | | |
| Forward | 0.50 | 2.25 | 16.4 |
| Reverse | 0.50 | 2.25 | 16.4 |

TABLE 5

"E" Specimens - Intra-Duct Section

| Current Direction | Specimen Width (inches) | Potential Electrode Separation (inches) | Resistance (ohms) |
|---|---|---|---|
| E1-E | | | |
| Forward | 0.50 | 4.82 | 778 |
| Reverse | 0.50 | 4.82 | 779 |
| E2-E | | | |
| Forward | 0.48 | 4.85 | 287 |
| Reverse | 0.48 | 4.85 | 287 |
| E3-E | | | |
| Forward | 0.50 | 4.81 | 682 |
| Reverse | 0.50 | 4.81 | 682 |
| E4-E | | | |
| Forward | 0.50 | 4.83 | 516 |
| Reverse | 0.50 | 4.83 | 516 |
| E5-E | | | |
| Forward | 0.48 | 4.82 | 749 |
| Reverse | 0.48 | 4.82 | 748 |

TABLE 6

"E" Specimens - Intra-Duct Section

| Current Direction | Specimen Width (inches) | Potential Electrode Separation (inches) | Resistance (ohms) |
|---|---|---|---|
| E1-C | | | |
| Forward | 0.50 | 2.02 | 160 |
| Reverse | 0.50 | 2.02 | 159 |
| E2-C | | | |
| Forward | 0.48 | 1.98 | 224 |
| Reverse | 0.48 | 1.98 | 223 |
| E3-C | | | |
| Forward | 0.50 | 2.00 | 183 |
| Reverse | 0.50 | 2.00 | 183 |
| E4-C | | | |
| Forward | 0.50 | 1.98 | 193 |
| Reverse | 0.50 | 1.98 | 194 |
| E5-C | | | |
| Forward | 0.48 | 2.00 | 173 |
| Reverse | 0.48 | 2.00 | 173 |

What is claimed is:

1. A self-grounding duct for transporting corrosive vapors and gases comprising a laminated inner wall comprising:
    an innermost layer formed of a cured epoxy vinyl ester resin and having a preselected thickness determined by an interior surface and an exterior surface; and
    a plurality of electrically conductive, continuous ribbons each having a multiplicity of longitudinal filaments impregnated with said cured epoxy vinyl ester resin, a preselected width determined by opposed generally parallel edges, and a preselected thickness, said ribbons disposed contiguously edge-to-edge to form a carbon band of a preselected width, said carbon band wound in a first plurality of contiguous helical segments forming a continuous first ribbon-layer embedded in said innermost layer and integrated with said interior surface, said first ribbon-layer in a preselected percentage-by-weight relative to the weight of the cured resin.

2. The duct of claim 1 wherein said filaments are continuous carbon fibers manufactured from polyacrylonitrile precursor.

3. The duct of claim 2 wherein the percentage-by-weight of said filaments is in a range from about 50 to about 70 percent, and the percentage-by-weight of said cured epoxy vinyl ester resin is in a range from about 30 to about 50 percent.

4. The duct of claim 2 wherein the thickness of said innermost layer is about 0.002- to 0.003-inch, and the thickness of each said ribbon and said first ribbon-layer is about 0.010-inch.

5. The duct of claim 2, further comprising a plurality of ribbon-layers, bounded by an inner ribbon-layer superposed on said first ribbon-layer and an outer ribbon-layer, formed by successive helical windings of said carbon band, the filaments of the ribbons forming said carbon band impregnated with said cured epoxy vinyl ester resin, said outer ribbon-layer coated with a layer of said cured epoxy vinyl ester resin of a preselected thickness.

6. The duct of claim 5, wherein the combined thickness of said first ribbon-layer and said plurality of ribbon-layers is about 0.050- to 0.060-inch, and the thickness of said cured epoxy vinyl ester resin layer is about 0.002- to 0.003-inch.

7. The duct of claim 5, further comprising a layer of mat-type fiberglass of a preselected weight and thickness and having an outer surface, impregnated with said cured epoxy vinyl ester resin and helically wound over said outer ribbon-layer.

8. The duct of claim 7, wherein said preselected weight of said mat-type fiberglass is about 0.75 ounce per square yard, and said thickness is in a range of about 0.025- to 0.032-inch.

9. The duct of claim 7, further comprising a laminated outer wall comprising:
    an innermost layer formed of a cured phenolic resin and having a preselected thickness determined by an interior surface and an exterior surface, said interior surface contiguous to said outer surface of said layer of mat-type fiberglass;
    a plurality of continuous ribbons each having a multiplicity of longitudinal glass filaments of a preselected weight impregnated with said cured phenolic resin, a preselected width determined by opposed generally parallel edges, and a preselected thickness, said ribbons disposed contiguously edge-to-edge to form a glass band of a preselected width, said glass band wound helically as a first plurality of ribbon-layers bounded by a first inner ribbon-layer integrated with said phenolic resin layer and a first outer ribbon-layer, forming a first glass layer of a first predetermined thickness; and
    additional glass band, impregnated with said cured phenolic resin, wound helically as a second plurality of ribbon-layers bounded by a second inner ribbon-layer, contiguous to said first outer ribbon-layer, and a second outer ribbon-layer, forming a second glass layer of a second predetermined thickness.

10. The duct of claim 9, wherein said preselected weight of the glass filament is about 250 feet per pound, and the combined thickness of said first and second glass layers is in a range of about 0.062-inch to about 0.625-inch.

11. The duct of claim 9, said outer wall further comprising a layer of glass veil, impregnated with said cured phenolic resin and having a preselected thickness determined by an inner surface and an outer surface, helically wound around said second glass layer, said inner surface contiguous to said second outer ribbon-layer.

12. The duct of claim 11, wherein said thickness of the glass veil is about 0.010-inch.

13. A duct in accordance with claim 11 having an end portion terminating in an edge portion determined by circumferential inner and outer surfaces, said edge portion closely receiving a first portion of a generally cylindrical laminated collar having an opposed second portion, said first and second portions symmetric with respect to a circumferential rib, said collar second portion closely received within an edge portion terminating in an end portion, determined by circumferential inner and outer surfaces, of a second duct in accordance with claim 11, said collar having first and second layers of carbon ribbon-layers and a epoxy vinyl ester impregnating resin admixture, and an outer layer of glass ribbon-layers and said epoxy vinyl ester resin admixture, said duct edge inner and outer surfaces and collar portions circumferentially sealed with a curable sealant composition comprising, per 100 parts-by-weight thereof, about 10 to 30 parts-by-weight of a hardener, and about 10 to 60 parts-by-weight of carbon fibers.

* * * * *